Dec. 28, 1948.  R. J. KELBERER  2,457,380
RETRACTABLE STEPS AND RAMP APPLIANCE FOR VEHICLES
Filed April 29, 1946  2 Sheets-Sheet 1
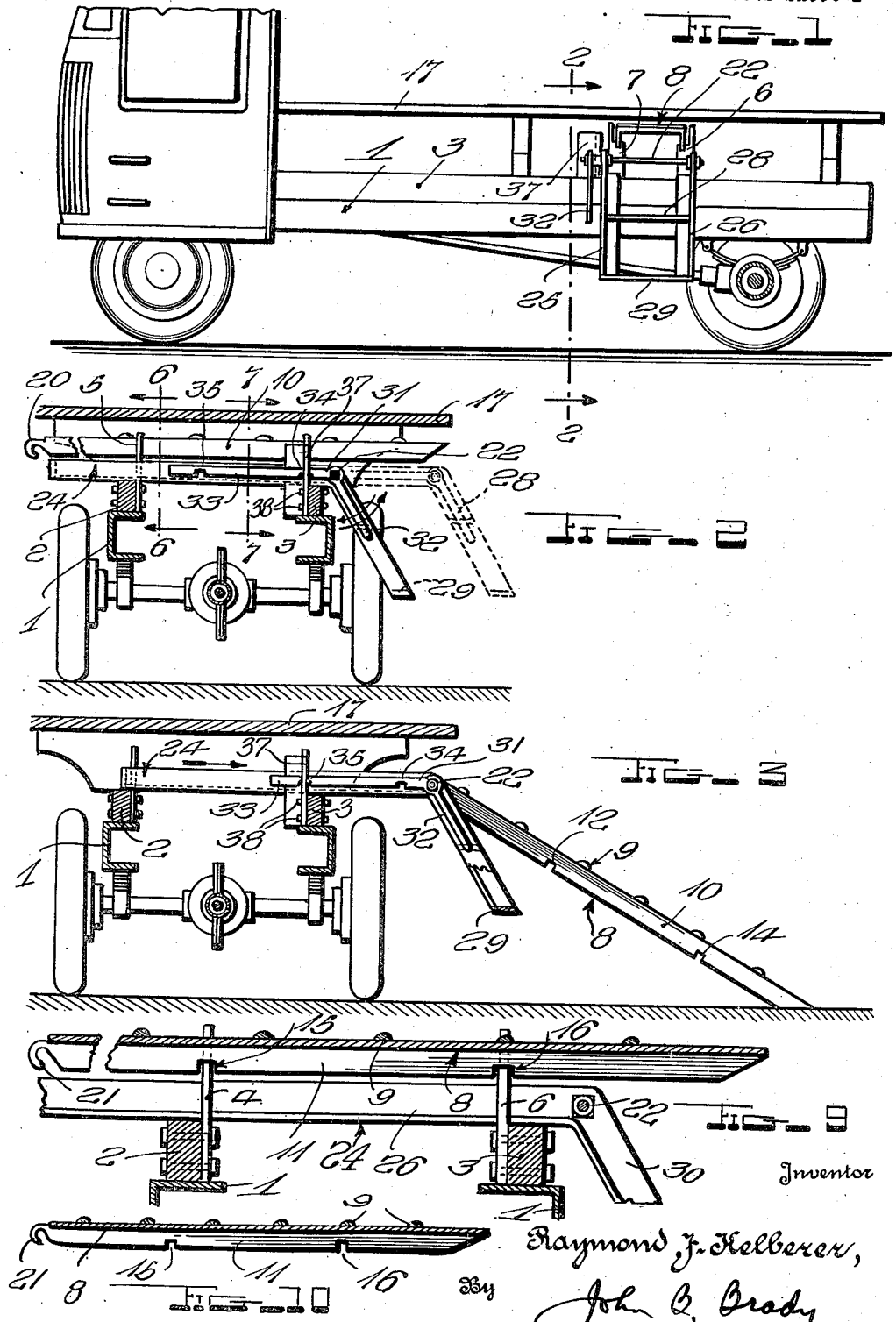
Inventor
Raymond J. Kelberer,
By John C. Brady
Attorney Dec. 28, 1948.  R. J. KELBERER  2,457,380
RETRACTABLE STEPS AND RAMP APPLIANCE FOR VEHICLES
Filed April 29, 1946  2 Sheets-Sheet 2
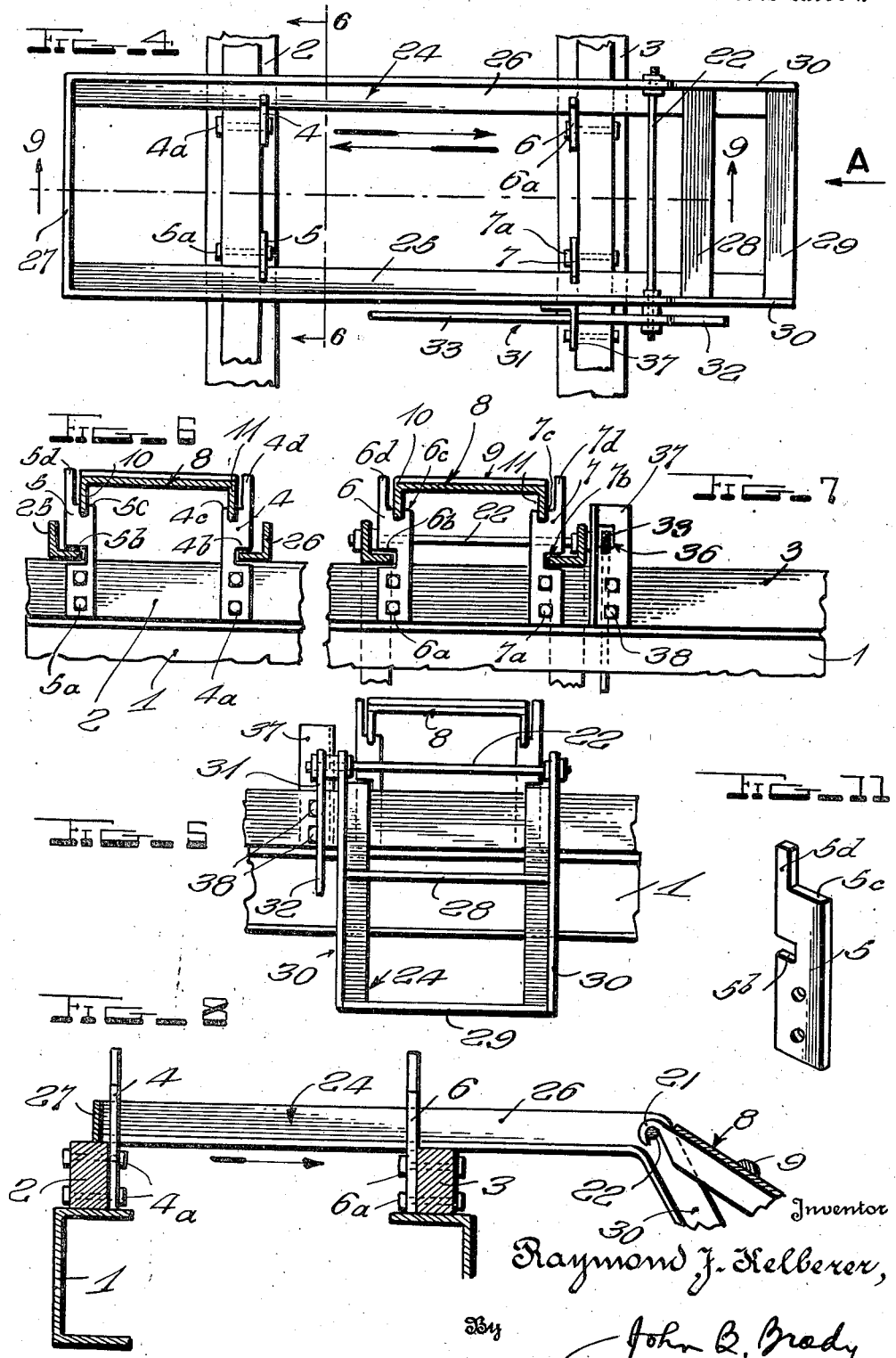
Inventor
Raymond J. Kelberer,
By John B. Brady
Attorney Patented Dec. 28, 1948

2,457,380

UNITED STATES PATENT OFFICE 2,457,380

RETRACTABLE STEP AND RAMP APPLIANCE FOR VEHICLES

Raymond J. Kelberer, Wolf Point, Mont.

Application April 29, 1946, Serial No. 665,800

8 Claims. (Cl. 280—164)

My invention relates broadly to vehicles, and more particularly to a vehicle step and ramp.

One of the objects of my invention is to provide a construction of step and ramp which may be readily applied to vehicles for facilitating loading and unloading of the vehicle.

Another object of my invention is to provide an improved construction of step and ramp which may be attached to a vehicle transversely of the vehicle body for facilitating entry upon or the alighting from a vehicle.

Still another object of my invention is to provide a composite structure which may be mounted transversely of the vehicle chassis for supporting the vehicle step in position to be ready for stored or operative position in association with a ramp which may be normally secured with respect to the frame structure while the vehicle is in operation but which may be readily moved to operative position when the vehicle is being loaded or unloaded.

Still another object of my invention is to provide a construction of composite transverse step and ramp for vehicles which may be readily stored with respect to the vehicle chassis when the vehicle is in motion and conveniently withdrawn transversely of the vehicle chassis for loading or unloading operations.

Other and further objects of my invention reside in the compact construction of composite step and ramp for vehicles as set forth more fully in the specification hereinafter following by reference to the accompanying drawings, in which:

Figure 1 is a side elevational view of a truck equipped with the step and ramp of my invention, the step and ramp being shown on an enlarged scale and the body of the truck being somewhat elevated to more clearly show the transverse step and ramp of my invention; Fig. 2 is a vertical sectional view taken on line 2—2 of Fig. 1 and showing the ramp and transverse step in stowed position with the step illustrated in dotted line to show the position to which the step can be extended with respect to the body of the truck; Fig. 3 is a view similar to the view illustrated in Fig. 2 but showing the step in projected position with the ramp supported in loading position; Fig. 4 is a fragmentary plan view of the chassis illustrating the step in stowed position but with the ramp omitted to avoid confusion; Fig. 5 is an end view of the step and ramp assembly looking in the direction of arrow A in Fig. 4; Fig. 6 is a vertical sectional view taken on line 6—6 of Figs. 2 and 4; Fig. 7 is a vertical sectional view taken on line 7—7 of Fig. 2; Fig. 8 is a transverse sectional view on an enlarged scale showing the step moved to projected position with the ramp supported in loading position; Fig. 9 is a transverse sectional view taken substantially on line 9—9 of Fig. 4 and illustrating the locking means for retaining the ramp in place while the vehicle is in motion or when the ramp is not required for loading or unloading; Fig. 10 is a detail view of the ramp when removed from the carrier associated with the transverse step; and Fig. 11 is a perspective view of one of the guide members employed for supporting and guiding the ramp in relation to the extendable transverse step.

My invention is directed to the construction of an attachment for vehicles which will facilitate the loading and unloading of vehicles. I provide a frame structure which is readily attachable to existing types of vehicles and adapted to be arranged transversely of the chassis thereof. The frame structure provides a mounting means for a horizontally slidable step-like frame and a loading and unloading ramp or skid. The frame structure serves as a guide for the step-like frame and also the ramp or skid. The step-like frame is transversely slidable of the vehicle chassis in guide members which conjointly align the step-like frame and ramp or skid. The same structural elements which operate to guide the movement of the step-like frame also serve as means for maintaining the ramp or skid in position. The step-like frame and the ramp or skid may be stowed in position beneath the vehicle chassis while the vehicle is in transit and latched therein to prevent displacement due to vibration or movement of the chassis and yet ready at all times to be unlatched and extended to operative position at the side of the vehicle for presenting the step-like frame in a position at the side of the vehicle chassis to enable the attendant or driver to mount or alight from the vehicle, and enabling the ramp or skid to be utilized in facilitating the loading or unloading of the vehicle.

Referring to the drawings in detail, reference character 1 designates the chassis of a vehicle including a pair of longitudinally extending substantially parallel structural members 2 and 3. The structural members 2 and 3 are provided at spaced intervals with vertically extending members 4, 5, 6, and 7 secured to the structural members 2 and 3 by appropriate bolts or other means 4a, 5a, 6a, and 7a.

The members 4, 5, 6, and 7 are each provided with a transversely extending recess or slot 4b, 5b, 6b, and 7b located immediately above the structural elements 2 and 3. The members 4, 5, 6, and 7 terminate at their upper ends in offset portions 4c, 5c, 6c, and 7c. The offset portions of members 4, 5, 6, and 7 are each arranged directly opposite each other and have vertically extending confining portions 4d, 5d, 6d, and 7d, between which the side portions of the frame 8 which support the ramp or skid 9 are confined when the frame 8 is in stowed position. The frame 8 includes a pair of depending side portions 10 and 11 which are recessed in spaced positions at 12, 14, 15 and 16 and which are spaced for a distance equal to the transverse distance between the members 5—7 and 4—6. These recesses or notches 12, 14, 15, and 16 enable the ramp or skid to be gravitationally latched in position with respect to the vertically extending members 4, 5, 6 and 7, while the vehicle is in transit. In this latched position the confining portions 4d, 5d, 6d, and 7d of members 4, 5, 6, and 7 serve as guides for the transverse movement of the frame 8 when the frame 8 is being detached from its stowed position for movement into operative position of the ramp or skid, as represented in Fig. 3. During transit, however, the frame 8 is gravitationally latched over the offset portions 4c, 5c, 6c, and 7c of the members 4, 5, 6, and 7 and confined against either transverse or longitudinal displacements. The members 4, 5, 6, and 7 terminate in spacial relation to the under surface of the platform portion 17 of the vehicle, with sufficient distance between the ends of the members 4, 5, 6, and 7 and the under surface of platform 17 to permit the raising of the ramp or skid sufficiently to elevate the recesses or notches 12, 14, 15, and 16 out of engagement with the offset portions 4c, 5c, 6c, and 7c of members 4, 5, 6, and 7 sufficiently to withdraw the ramp or skid from stowed position to the operative position illustrated in Fig. 3. Offset portions 4c, 5c, 6c and 7c constitute aligned sets of recesses in which frame 8 may slide. The frame 8 is provided with engaging hooks 20 and 21 at the ends thereof which respectively engage with spaced portions of the cross bar 22 carried by the sides of the step-like frame 24.

The step-like frame 24 is formed by angle members 25 and 26 which extend transversely of the vehicle chassis. Angle members 25 and 26 have their horizontally extending flat sides projecting into the recesses 4b, 5b, 6b, and 7b of members 4, 5, 6, and 7 in such manner that the step-like frame 24 is free to slide transversely of the vehicle chassis confined in position by members 4, 5, 6, and 7. Recesses 4b and 5b constitute one aligned set of recesses in the guide means formed by members 4 and 5 while recesses 6b and 7b in members 6 and 7 are aligned and constitute a second set of guide means for controlling the sliding of step-like frame 24. Set of recesses 4b and 5b is on a different level with reference to set of recesses 4c and 5c and likewise set of recesses 6b and 7b is on a different level with respect to set of recesses 6c and 7c and thus provide guide means at different levels for the frame 8 and the frame 24.

Opposite ends of the step-like frame 24 are closed by members 27 and 28, and 29. Members 28 and 29 constitute steps in the depending portion 30 of the step-like frame 24. The depending portion 30 of step-like frame 24 is angularly disposed with respect to the horizontally extending portion of the frame 24 and depends downwardly therefrom and at an acute angle thereto with respect to a vertical plane through the sides of the vehicle chassis. The step-like frame is slidable transversely of the vehicle chassis to present the steps 28 and 29 in operative position at the side of the vehicle as represented in Fig. 3, or to allow stowage of the step-like frame beneath the vehicle chassis, as represented in Fig. 2.

To facilitate the transverse shift of the step-like frame from the retracted position of Fig. 2 to the extended position of Fig. 3, I provide a bell crank 31 journaled on the cross bar 22 of the step-like frame 24. The bell crank 31 has a hand-operated grip 32 on one end thereof and a notched or recessed extension 33 on the other end thereof. The extension 33 is provided with spaced notches or recesses 34 and 35 which may be engaged with the apertured portion 36 of the vertically extending member 37 which is secured as represented at 38 to the longitudinally extending structural member 3. The aperture 36 in the member 37 provides a passage for the extension 33 of the bell crank 31 which may be angularly shifted by manually gripping the end 32 of the bell crank for raising notch 34 out of engagement with the lower edge of apertured portion 36 of member 37. When thus elevated, the step-like frame may be transversely withdrawn with respect to the side of the vehicle and extended to the position illustrated in Fig. 3, whereupon, hand grip 32 is released and the notched portion 35 of recessed extension 33 drops into engagement with the lower edge of apertured portion 36 of member 37.

Thus, the transversely adjustable step may be shifted to the projected position shown in Fig. 3 for use in loading and unloading, and latched in that position or shifted to the stowed position illustrated in Fig. 2 and latched in that position. Similarly, the ramp or skid 8 may be removed from stowed position illustrated in Fig. 2 and moved between the confining portions 4d, 5d, 6d, and 7d of members 4, 5, 6, and 7 to the position illustrated in Fig. 3 in which hooks 20 and 21 on the ramp or skid engage over the bar 22 as represented more clearly in Fig. 8.

The structure of the vehicle appliance of my invention is very simple and inexpensive in manufacture and production. Because of the arrangement of the structural elements, considerable strength is imparted to the structure of the step or ramp and yet these parts are maintained in compact association. It will be observed that the structural member constituting frame 8 is substantially in the form of a channel, whereas, the structural members 25 and 26, forming part of step-like frame 24, are in the form of angle members. The side portions 10 and 11 of the frame 8, and the side portions of angle members 25 and 26 are directed toward each other in substantially parallel planes but offset sufficiently in vertical planes to permit the frame of the ramp or skid 8 to move between the sides of the step-like frame, but in substantially parallel and compact spaced relation thereto. The end 27 of the step-like frame 24 is restricted in the projected movement of the step-like frame by abutment with members 4 and 5 as illustrated in Fig. 8 while restricting the extent of projection of the step-like frame while the stowed position of the step-like frame illustrated in Fig. 2 is restricted by abutment of cross bar 22 with members 6 and 7 in the event that the notches of recesses 34 and 35 should not be engaged with the lower edge of the apertured portion 36 of member 37.

While I have described my invention in one of its preferred embodiments, I realize that modifications may be made in the structural arrangement of the parts of the vehicle appliance of my invention and I desire that it be understood that no limitations upon my invention are intended other than may be imposed by the scope of the appended claims.

What I claim as new and desire to secure by Letters Patent of the United States is as follows:

1. A vehicle appliance comprising a multiplicity of vertically disposed guide members attached to the frame structure of a vehicle chassis and extending to a position spacially related to the under surface of the vehicle platform, said guide means including aligned sets of recesses at different levels therein, a frame adjustable in one of the aligned sets of recesses at one level, and a ramp supportable within the aligned recesses in said guide means at another level, said frame being horizontally slidable with respect to said means below the level of said ramp, means carried by said frame and adapted to be engaged by said ramp when said ramp is moved to operative position, a latch member carried by said frame structure and means for engaging or disengaging said latch member for latching said frame in either a projected or stowed position adjacent the side of the vehicle on a level below the level of said ramp.

2. A vehicle appliance comprising a multiplicity of guide members connected with the frame structure of a vehicle chassis and extending vertically therefrom, each of said guide members having recesses therein directed in alignment with each other, a ramp provided with side portions each coacting with the recesses in said guide members, and latching means carried by the side portions of said ramp and engageable over said guide members for maintaining said ramp in position with respect to said chassis, and a horizontally shiftable fulcrum device carried by said chassis, and movable from a position adjacent said frame structure to a position displaced to one side thereof for engagement by the end of said ramp when said ramp is detached from said guide members and moved to loading and unloading position.

3. A vehicle appliance comprising in combination with the frame structure of the chassis of a vehicle, a multiplicity of spaced guide members carried by said frame structure, a horizontally adjustable frame guided by said guide members and movable from a stowed position at one side of the vehicle chassis to a projected position at the side of the vehicle chassis, a ramp horizontally movable with respect to said guide members, latching means carried by said ramp and engageable in said guide members for maintaining said ramp in position with respect to said guide members and a fulcrum bar carried by said adjustable frame, said fulcrum bar being engageable by one end of said ramp when said ramp is detached from said guide means and moved to loading and unloading position.

4. A vehicle appliance comprising a multiplicity of guide members attached to the frame structure of the chassis of a vehicle, a pair of frame members arranged in different horizontal planes spaced one over the other and movable transversely of said chassis within limits defined by said guide members, the lower frame member carrying fulcrum means thereon, and the upper frame member carrying attachment means thereon operative to engage the fulcrum means on the lower frame member when said upper frame member is detached from confined position with respect to said guide members and moved to loading and unloading position with respect to said lower frame member.

5. In a vehicle appliance a plurality of vertically extending guide members attached to the chassis of a vehicle beneath a vehicle platform, a pair of frame members normally confined in movement by said vertically extending guide members, said frame members being disposed in different substantially horizontal planes offset one from another, fulcrum means carried by the lower frame member adjacent one end thereof, attachment means carried by the upper frame member, and means for normally interlocking said upper frame member with said guide members in superimposed relation to said lower frame member, the attachment means on said upper frame member being engageable with the fulcrum means on said lower frame member adjacent to one end thereof when both of said frame members are shifted to loading and unloading position adjacent one side of said chassis.

6. In a vehicle appliance a plurality of vertically extending guide members attached to the chassis of a vehicle beneath a vehicle platform, a pair of frame members normally confined in movement by said vertically extending guide members, said frame members being disposed in different substantially horizontal planes offset one from another, fulcrum means carried by the lower frame member adjacent one end thereof, attachment means carried by the upper frame member adjacent the end thereof opposite to the last mentioned end of said lower frame member, and means for normally interlocking said upper frame member with said guide members in superimposed relation to said lower frame member, the attachment means on said upper frame member being engageable with the fulcrum means on said lower frame member when both of said frame members are shifted to loading and unloading position adjacent one side of said chassis.

7. In a vehicle appliance a plurality of vertically extending guide members attached to the chassis of a vehicle beneath a vehicle platform, a pair of frame members normally confined in movement by said vertically extending guide members, said frame members being disposed in different substantially horizontal planes offset one from another, fulcrum means carried by the lower frame member, attachment means carried by the upper frame member, means for normally interlocking said upper frame member with said guide members in superimposed relation to said lower frame member, the attachment means on said upper frame member being engageable with the fulcrum means on said lower frame member when both of said frame members are shifted to loading and unloading position adjacent one side of said chassis, a latch member carried by said chassis, and means pivotally mounted on said fulcrum bar and engageable with the latch member carried by said chassis for latching said lower frame in either stowed or projected position with respect to the side of the vehicle.

8. A vehicle appliance comprising a plurality of vertically extending guide members attached to a vehicle chassis and terminating in spaced relation to the bottom of the platform of the vehicle, upper and lower frame members, each including structural elements having flange members directed toward each other but offset in spaced verticlal planes and operating to engage said guide members, said lower frame member carrying fulcrum means on one end thereof, and said upper frame member having detachable engagement means at one end thereof for establishing detachable connection with the fulcrum means on said lower frame member when said lower and upper frame members are moved to loading and unloading position at one side of the vehicle and means for maintaining said lower frame member in either of two limiting positions with respect to said chassis.

RAYMOND J. KELBERER.

REFERENCES CITED

The following references are of record in the file of this patent:

UNITED STATES PATENTS

| Number | Name | Date |
| --- | --- | --- |
| 571,497 | Powell | Nov. 17, 1896 |
| 2,149,296 | Kelberer | Mar. 17, 1939 |
| 2,370,427 | Sherry | Feb. 27, 1945 |